United States Patent
Kim

(10) Patent No.: US 8,554,418 B2
(45) Date of Patent: Oct. 8, 2013

(54) ELECTRIC POWER STEERING APPARATUS AND CONTROL METHOD FOR CURRENT THEREOF

(75) Inventor: Seong Joo Kim, Seongnam-si (KR)

(73) Assignee: Mando Corporation, Gyeonggi-do (KR)

( * ) Notice: Subject to any disclaimer, the term of this patent is extended or adjusted under 35 U.S.C. 154(b) by 449 days.

(21) Appl. No.: 12/882,644

(22) Filed: Sep. 15, 2010

(65) Prior Publication Data

US 2011/0066330 A1    Mar. 17, 2011

(30) Foreign Application Priority Data

Sep. 15, 2009  (KR) .................. 10-2009-0087004

(51) Int. Cl.
    *B62D 5/04*    (2006.01)
(52) U.S. Cl.
    USPC ............. 701/44; 701/41; 180/443; 180/446
(58) Field of Classification Search
    USPC ............ 701/41, 42, 44; 180/417, 419, 420, 180/421, 422, 426, 427, 428, 429, 443, 447; 417/32, 392
    See application file for complete search history.

(56) References Cited

U.S. PATENT DOCUMENTS

| | | | | |
|---|---|---|---|---|
| 4,771,845 A | * | 9/1988 | Shimizu | 180/446 |
| 6,158,545 A | * | 12/2000 | Kaji et al. | 180/446 |
| 2003/0127278 A1 | * | 7/2003 | Matsuoka et al. | 180/446 |
| 2005/0257986 A1 | * | 11/2005 | Kagei | 180/404 |
| 2007/0205037 A1 | * | 9/2007 | Miyajima et al. | 180/422 |
| 2009/0276121 A1 | * | 11/2009 | Limpibunterng et al. | 701/41 |

* cited by examiner

*Primary Examiner* — Khoi Tran
*Assistant Examiner* — Spencer Patton
(74) *Attorney, Agent, or Firm* — McDermott Will & Emery LLP

(57) ABSTRACT

An electric power steering apparatus includes a temperature sensor measuring a temperature at a starting of a vehicle, a motor position sensor detecting a relative steering angle of a motor, a cumulative transfer calculation unit calculating a cumulative transfer quantity of a rack bar by information detected in the motor position sensor, a counter calculating an elapsed time from a starting time of the vehicle, a friction coefficient determination unit determining a friction coefficient according to information inputted from the temperature sensor, the cumulative transfer quantity calculation unit, and the counter, respectively, by using a setting map of a friction coefficient, and a target current calculation unit calculating a compensation quantity for a friction by using the friction coefficient determined in the friction coefficient determination unit and determining a target current.

4 Claims, 2 Drawing Sheets

ELECTRIC POWER STEERING APPARATUS AND CONTROL METHOD FOR CURRENT THEREOF

BACKGROUND OF THE INVENTION

1. Field of the Invention

The present invention relates to an electric power steering apparatus. More particularly, the present invention relates to an electric power steering apparatus capable of controlling a current thereof and a method of controlling the current, which can compensate for a current of a motor so as to increase auxiliary steering power of a vehicle in response to an increase of friction caused by contraction or an increase of viscosity at a low temperature, such as in the winter season.

2. Description of the Prior Art

A steering apparatus of a vehicle has generally adopted a hydraulic power steering apparatus using hydraulic power of a hydraulic power pump. However, an electric power steering apparatus using a motor has been gradually and widely used since 1990.

In the existing hydraulic power steering apparatus, a hydraulic pump, serving as a power source for supplying auxiliary steering power, is driven by an engine, to always consume energy regardless of the rotation of a steering wheel. However, in the electric power steering apparatus, when a steering torque is generated by the rotation of the steering wheel, the motor supplies auxiliary steering power proportional to the generated steering torque. Therefore, the electric power steering apparatus can improve the energy efficiency more than hydraulic power steering apparatus.

FIG. 1 is a view illustrating the electric power steering apparatus according to a prior art. As illustrated in FIG. 1, the electric power steering apparatus generally includes a steering system 100 extending from a steering wheel 101 to wheels 108 in both sides and an auxiliary power mechanism 120 for supplying auxiliary steering power to the steering system 100.

The steering system 100 includes a steering shaft 102, of which an upper end is connected to the steering wheel 101 to rotate together with the steering wheel 101 and a lower end is connected to a pinion shaft 104 through a pair of universal joints 103. Further, the pinion shaft 104 is connected to a rack bar 109 through a rack-pinion mechanism part 105 and both ends of the rack bar 109 are connected to the wheels 108 of a vehicle through a tie rod 106 and a knuckle arm 107.

The rack-pinion mechanism part 105 is provided with a pinion gear 111, which is formed at a lower end of the pinion shaft 104, engaged with a rack gear 112 formed at one side of an outer peripheral surface of the rack bar 109. The rotational movement of the pinion shaft 104 is changed to a linear movement by the rack-pinion mechanism part 105. Therefore, when a driver operates the steering wheel 101, the pinion shaft 104 rotates, the rack bar 109 linearly moves in a shaft direction according to the rotation of the pinion shaft 104, and the linear movement of the rack bar 109 steers the wheels 108 through the tie rod 106 and the knuckle arm 107.

The auxiliary power mechanism 120 includes a torque sensor 121 for sensing steering torque applied to the steering wheel 101 by the driver and outputting an electric signal proportional to the sensed steering torque, an Electric Control Unit (ECU) 123 for generating a control signal based on the electric signal transferred from the torque sensor 121, a motor 130 for generating auxiliary steering power based on the control signal transferred from the ECU 123, and an electric power apparatus 140 for transferring auxiliary power generated in the motor 130 to the rack bar 109 through a gear, a belt, etc.

Therefore, in the electric power steering apparatus as described above, the steering torque generated by the rotation of the steering wheel 101 is transferred to the rack bar 109 through the rack-pinion mechanism part 105, and the auxiliary steering power generated in the motor 130 according to the generated steering torque is transferred to the rack bar 109 through the electric power apparatus 140.

Contrary to FIG. 1, the electric power steering apparatus can be constructed in such a manner as to transfer the auxiliary steering power generated in the motor 130 to the steering shaft 102 or the pinion shaft 104 through the electric power apparatus 140. That is, the steering torque generated in the steering system 100 is combined with the auxiliary steering power generated in the motor 130, to move the rack bar 109 in the shaft direction.

However, in the aforementioned electric power steering apparatus, when the user starts and initially steers a car which has been left for a long time in a cold weather or at a low temperature, such as in the winter season, the larger steering power than that of a normal condition is required. Such a phenomenon is caused by the contraction of the elements of the electric power apparatus or the increase of viscosity of a lubricating fluid, such as guris, at a lower temperature.

Therefore, a compensation means for controlling the current of the motor that generates the power supporting the steering power according to the temperature has been demanded.

SUMMARY OF THE INVENTION

Accordingly, the present invention has been made to solve the above-mentioned problems occurring in the prior art, and the present invention provides an electric power steering apparatus capable of controlling a current thereof and a method of controlling the current, which can compensate for a current of a motor so as to increase auxiliary steering power of a vehicle in response to an increase of friction caused by contraction or an increase of viscosity at a low temperature, such as in the winter season.

In accordance with an aspect of the present invention, there is provided an electric power steering apparatus comprising: a temperature sensor for measuring a initial temperature of the electric power steering apparatus at a starting of a vehicle; a counter for calculating an elapsed time from a starting time of the vehicle; a friction coefficient determination unit for determining a friction coefficient according to the measured temperature and the calculated elapsed time by using a setting map of a friction coefficient; and a target current calculation unit for calculating a compensation quantity for a friction by using the friction coefficient and determining a target current required for driving of a motor based on the calculated compensation quantity.

In accordance with an aspect of the present invention, there is provided a method of controlling a current of the electric power steering apparatus, the method comprising the steps of: measuring a initial temperature of the electric power steering apparatus at a starting of a vehicle; calculating an elapsed time from a starting time of the vehicle; determining a friction coefficient according to the measured temperature and the calculated elapsed time by using a setting map of a friction coefficient; calculating a compensation quantity for a friction by using the determined friction coefficient and determining a target current; and driving a motor by the determined target current.

Accordingly, the present invention can control the current for compensating for the current of the motor, in order to increase the auxiliary steering power of the vehicle in response to the increase of the friction due to the contraction or the increase of viscosity at a low temperature, such as in a winter season, thereby improving the convenience of a driver and the product value.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Figure 1:
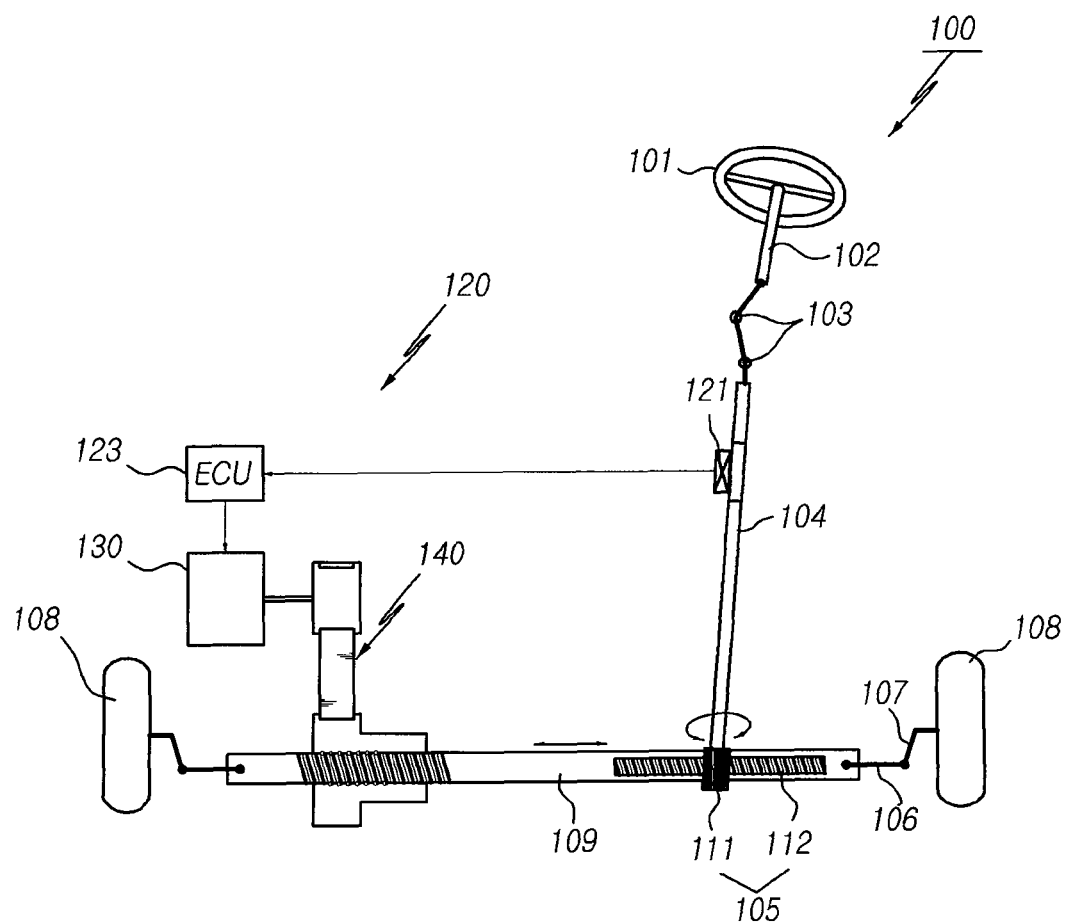
FIG. 1 is a view illustrating the electric power steering apparatus according to a prior art.

Hereinafter, preferred embodiments of the present invention will be described with reference to the accompanying drawings. In the following description, the same elements will be designated by the same reference numerals although they are shown in different drawings. In the following description, detailed explanation of known related functions and constitutions may be omitted to avoid unnecessarily obscuring the subject manner of the present invention.

An electric power steering apparatus according to the present invention includes, as shown in FIG. 1, the steering system 100 receiving the steering torque of the steering wheel 101 so as to steer the wheels 108 and the auxiliary power mechanism 120 including the torque sensor 121, the ECU 123, the motor 130, and the electric power apparatus 140 for applying the auxiliary steering power to the steering system 100.

Figure 2:
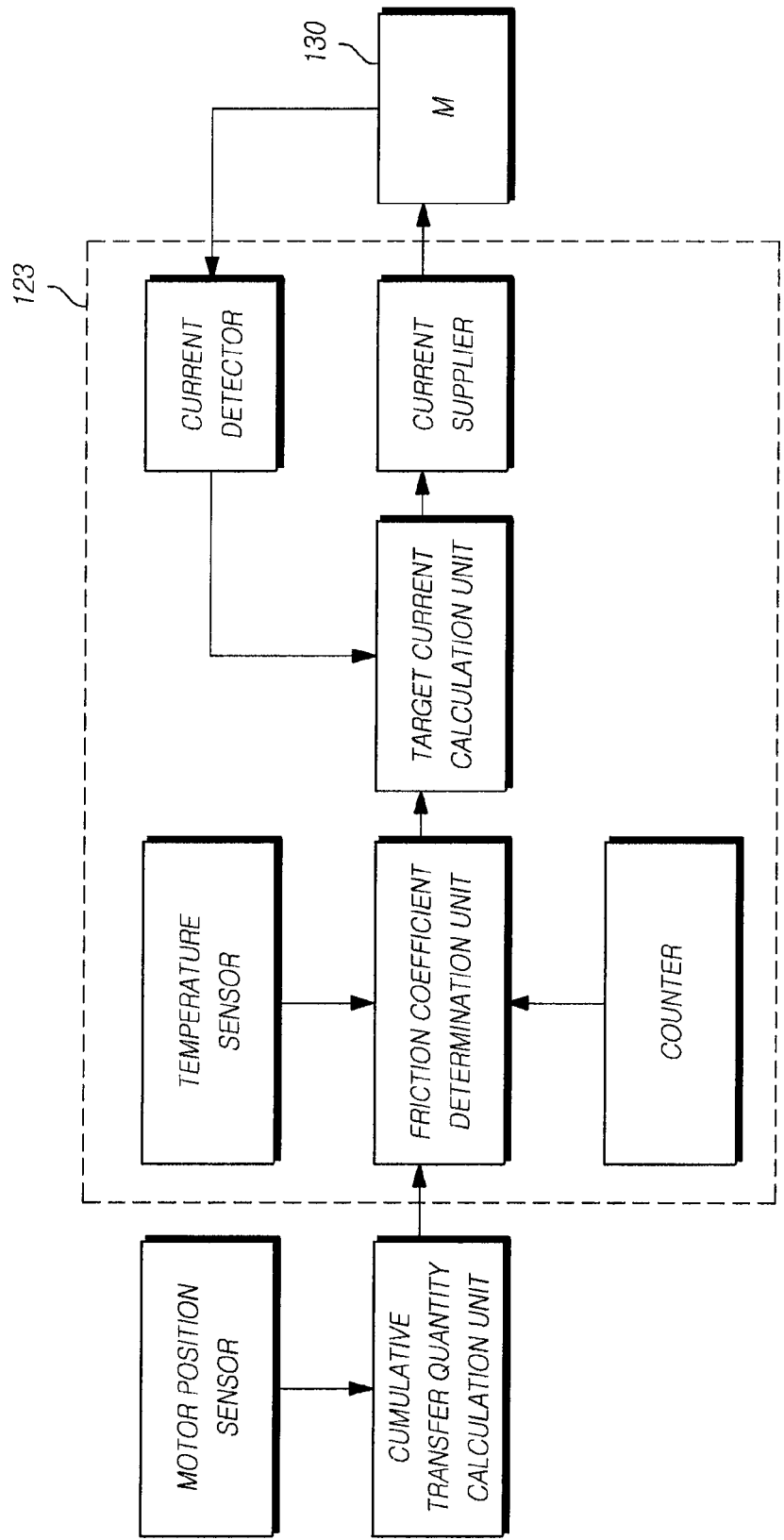
FIG. 2 is a block diagram illustrating a part of an electric power steering apparatus capable of controlling the current according to the present invention.

FIG. 2 is a block diagram illustrating a part of the electric power steering apparatus capable of controlling the current according to the present invention. As shown in FIG. 2, the electric power steering apparatus according to the present invention includes a temperature sensor for measuring a temperature at the starting of a car, the temperature sensor being located within the ECU 123, a motor position sensor for detecting a relative steering angle of the motor 130, the motor position sensor being mounted in the motor 130, a cumulative transfer quantity calculation unit for calculating a cumulative transfer quantity of the rack bar 109 by using information detected in the motor position sensor, a counter for calculating an elapsed passage from a starting time, the counter being located within the ECU 123, a friction coefficient determination unit for determining a friction coefficient by using a setting map of a friction coefficient according to information inputted from the temperature sensor, the cumulative transfer quantity calculation unit, and the counter, respectively, and a target current calculation unit for calculating a compensation quantity for the friction by using the friction coefficient determined in the friction coefficient determination unit and determining a target current.

The temperature sensor is positioned within the ECU 123 and measures an initial temperature of the steering system (for example, ECU in the steering system) at the starting of the entire steering system. After the starting of the steering system, the temperature within the ECU 123 increases by the heat of the ECU 123, so that the temperature sensor is used by only a degree of predicting a friction level according to the contraction at a low temperature at the initial starting of the steering system.

The friction created by the increase of the viscosity of the lubricating fluid, such as guris, decreases according to the movement of the electric power apparatus 140 and the rack bar 109, so that the transfer quantity of the electric power apparatus 140 and the rack bar 109 has to be calculated. The cumulative transfer quantity calculation unit can calculate the cumulative transfer quantity by using the motor position sensor, which is mounted in the motor 130 and detects a relative steering angle of the motor. As the transfer quantity becomes larger, the temperature of the electric power apparatus 140 and the rack bar 109 increases, so that the friction according to the viscosity gradually decreases.

Further, the temperature of the entire steering system with respect to the elapsed time may increase due to the increase of the temperature of the engine after the starting of the steering system, so that the temperature has to be adjusted through the counter, which calculates the elapsed time from the starting time. The counter can be positioned within the ECU 123.

Here, the temperature of the entire steering system can be predicted on a basis of a test value, etc. gradually increasing by various heat sources.

The friction coefficient determination unit determines the appropriate friction coefficient according to information, i.e. the temperature, the cumulative transfer quantity, and the time, inputted from the temperature sensor, the cumulative transfer quantity calculation unit, and the counter, respectively, by using a stored setting map of a friction coefficient.

The target current calculation unit calculates the compensation quantity for the friction by using the friction coefficient determined in the friction coefficient determination unit and determines the target current required for the driving of the motor 130 in accordance with the calculated compensation quantity. In order to decrease the steering power of the driver, the target current is determined to have a value capable of increasing the output of the motor 130 by the compensation quantity in comparison with the output in the normal state (for example, a state at reference temperature). That is, the target current is a current for increasing auxiliary steering power, in order to decrease steering power of a driver increased by an increase of the friction coefficient at a temperature lower than reference temperature (for example, room temperature).

The target current determined in the target current calculation unit is applied to the motor 130 through a current supplier, to drive the motor 130. When the motor 130 is driven, a current detector detects an actual current of the motor 130.

As the temperature of the steering system increases by various heat sources and the transfer quantity of the rack bar 109 increases according to the passage of time, the friction according to the contraction and the viscosity at a low temperature gradually decrease, so that the compensation quantity, ultimately the target current, gradually decreases. Therefore, the compensation quantity gradually decreases, so that the target current at the normal state (normal temperature) is left.

According to an operation of the electric power steering apparatus of the present invention, the temperature sensor measures a temperature of the entire steering system at the starting time of a vehicle, the cumulative transfer quantity calculation unit calculates the cumulative transfer quantity of the rack bar 109 by using information detected in the motor position sensor, and the counter calculates the elapsed time from the starting time.

Then, when the friction coefficient determination unit determines the appropriate friction coefficient according to information inputted from the temperature sensor, the cumulative transfer quantity calculation unit, and the counter, respectively, by using a stored setting map of a friction coefficient, the target current calculation unit calculates the compensation quantity for the friction by using the determined friction coefficient and determines the target current required for the driving of the motor 130 in accordance with the calculated compensation quantity.

Next, the target current determined in the target current calculation unit is applied to the motor 130 through the current supplier, to drive the motor 130. When the motor 130 is driven, the current detector detects an actual current of the motor 130.

As the temperature of the steering system increases by various heat sources and the transfer quantity of the rack bar 109 increases according to the passage of time, the compensation quantity gradually decreases so that the target current at the normal state is left.

Although an exemplary embodiment of the present invention has been described for illustrative purposes, those skilled in the art will appreciate that various modifications, additions and substitutions are possible, without departing from the scope and spirit of the invention as disclosed in the accompanying claims. While the present invention has been shown and described with reference to certain exemplary embodiments thereof, it will be understood by those skilled in the art that various changes in form and details may be made therein without departing from the spirit and scope of the invention as defined by the appended claims. Therefore, an exemplary embodiment of the present invention has not been described for limiting purposes so that the scope and spirit of the invention may not be limited by the exemplary embodiment thereof. Accordingly, the scope of the invention is not to be limited by the above embodiments but by the claims and the equivalents thereof.

The invention claimed is:

1. An electric power steering apparatus comprising:
   a temperature sensor for measuring an initial temperature of the electric power steering apparatus at a starting of a vehicle;
   a counter for calculating an elapsed time from a starting time of the vehicle;
   a cumulative transfer quantity calculation unit for calculating a cumulative transfer quantity of a rack bar by using information of a relative steering angle of a motor;
   a friction coefficient determination unit for determining a friction coefficient according to the measured temperature, the calculated elapsed time and the calculated cumulative transfer quantity by using a setting map of the friction coefficient; and
   a target current calculation unit for calculating a compensation quantity for friction by using the friction coefficient and determining a target current required for driving of the motor based on the calculated compensation quantity.

2. The electric power steering apparatus as claimed in claim 1, wherein, the target current is a current for increasing auxiliary steering power, in order to decrease steering power of a driver increased by an increase of the friction coefficient at a temperature lower than a reference temperature.

3. The electric power steering apparatus as claimed in claim 1, further comprising:
   a motor position sensor for detecting the relative steering angle of the motor and for outputting, to the cumulative transfer quantity calculation unit, the cumulative transfer quantity of the rack bar.

4. A method of controlling a current of an electric power steering apparatus, the method comprising steps of:
   measuring an initial temperature of the electric power steering apparatus at a starting of a vehicle;
   calculating an elapsed time from a starting time of the vehicle;
   calculating a cumulative transfer quantity of a rack bar by using information of a relative steering angle of a motor;
   determining a friction coefficient according to the measured temperature, the calculated elapsed time and the calculated cumulative transfer quantity by using a setting map of the friction coefficient;
   calculating a compensation quantity for friction by using the determined friction coefficient and determining a target current; and
   driving a motor by the determined target current.

* * * * *